United States Patent [19]

Itasaka et al.

[11] 3,906,847
[45] Sept. 23, 1975

[54] COFFEE EXTRACTING APPARATUS

[76] Inventors: Tamotsu Itasaka; Fumiko Itasaka, both of Robby Coffee Shop, 37, Sanae-cho, Moriguchi, Japan

[22] Filed: Sept. 6, 1973

[21] Appl. No.: 394,665

[52] U.S. Cl. ............................ 99/287; 99/421 H
[51] Int. Cl.² ........................................ A47J 31/00
[58] Field of Search .......... 99/287, 286, 289, 295, 99/323, 348–349, 421 P, 421 M, 421 H; 68/244, 247, 252; 100/73, 122, 123

[56] References Cited
UNITED STATES PATENTS

| | | | |
|---|---|---|---|
| 651,149 | 6/1900 | Snedeker | 99/421 MX |
| 824,592 | 6/1906 | Schayer | 100/123 X |
| 1,002,376 | 9/1911 | Doty | 100/123 UX |
| 1,051,502 | 1/1913 | Klein | 99/421 HX |
| 1,189,035 | 6/1916 | Asbury & Punzelt | 99/286 X |
| 1,281,984 | 10/1918 | Long | 99/287 X |
| 1,666,394 | 4/1928 | Miglin | 99/421 H |
| 2,251,859 | 8/1941 | Vasarhelyi | 100/123 X |
| 3,370,524 | 2/1968 | Kasakoff | 99/287 |

Primary Examiner—Harvey C. Hornsby
Assistant Examiner—Arthur O. Henderson
Attorney, Agent, or Firm—Armstrong, Nikaido & Wegner

[57] ABSTRACT

The present invention relates to a coffee extracting apparatus of such a design that an extraction bag having a filtering bottom is inserted in the extraction vessel opened at its top, and the bag may be pulled up after putting the ground coffee beans and hot water into the bag, so that the essence of coffee may be extracted due to the aspirating action that may be developed at the lower side of the bag, and the extraction residuum may be thrown away in the state of being contained in the extraction bag.

7 Claims, 3 Drawing Figures

COFFEE EXTRACTING APPARATUS

BACKGROUND OF THE INVENTION

With the conventional pot-type coffee extractor hitherto used, it involves an inconvenience of the hot water being poured in several divisions; especially, the method of pouring the hot water is irregular. Moreover, the coffee extracted is oxidized, because it comes in contact with air. As a consequence, the flavor of the coffee is lost, thereby making its taste somewhat sour.

Such an extracting apparatus is unsanitary because the coffee extraction residuum is thrown away into the kitchen refuse disposer in the state of not being lumped. Moreover, it is troublesome to clean the filtering bag.

Another coffee extracting apparatus available is of the siphon type. This type of apparatus is not only difficult in its handling, but also is especially troublesome in the cleaning of its siphon device after throwing away the coffee extraction residuum. Moreover, because a large amount of bubbles are generated when the level of the hot water poured in rises up, the oxidation of coffee is more conspicuous than in case when the coffee is made by use of the aforementioned pot type coffee extractor.

The present invention has, as its objective, a provision of an extracting apparatus, with which coffee may be readily extracted.

Another object is to obtain an extracting apparatus, in which a method is devised to achieve the stability of the flavor of coffee always and the prevention of its oxidation.

Still another objective is to provide a coffee extractor which is made especially effective in terms of hygiene by facilitating the disposal of the coffee extraction residuum.

SUMMARY OF THE INVENTION

According to the present invention, an extraction bag made of a soft film with its bottom composed of a filtering material is inserted in a vessel opened at its top, and after putting the ground coffee and a definite amount of hot water into the bag, the bag is pulled up by use of the take-up mechanism, after being properly squeezed.

DETAILED DESCRIPTION OF THE INVENTION

Figure 1:
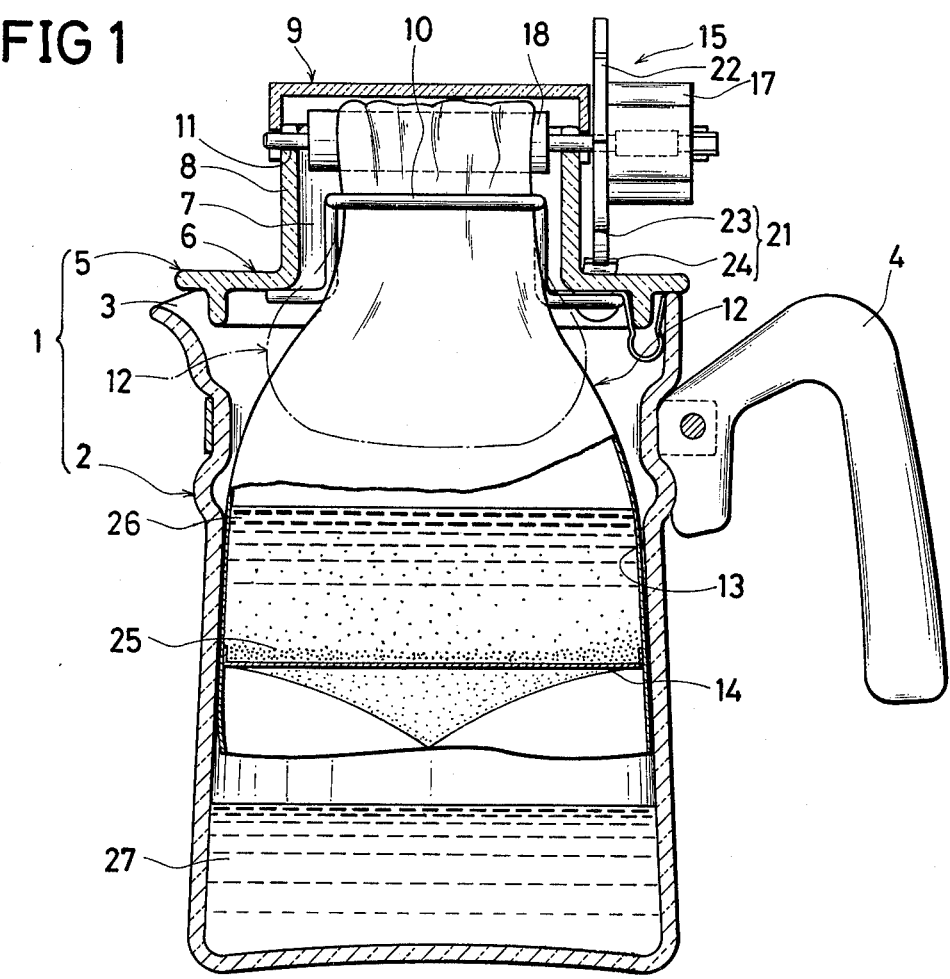
FIG. 1 exhibits a vertical sectional view showing this apparatus being in use.
Figure 2:
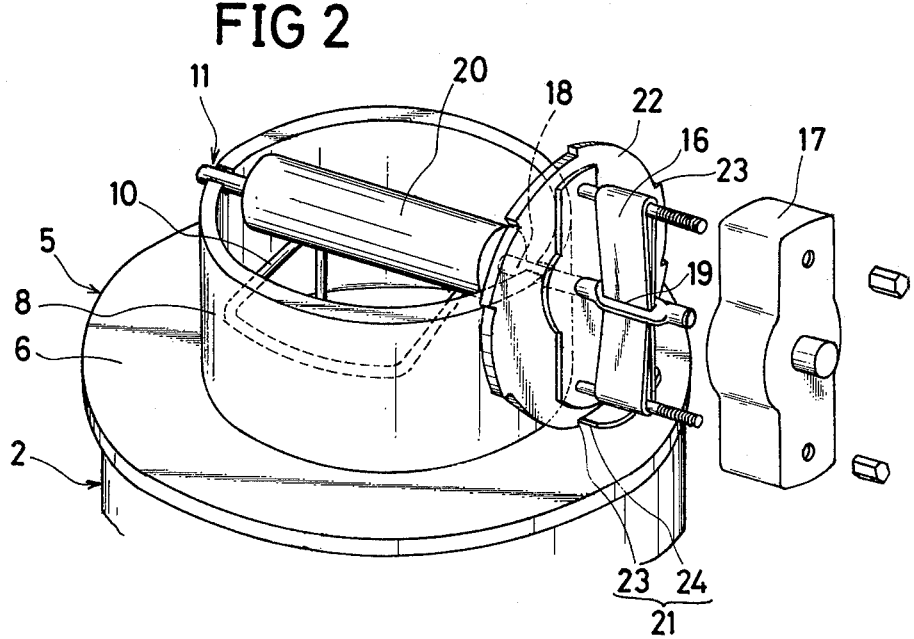
FIG. 2 displays an enlarged oblique view of the essential part exposing the rotation biasing means of the take-up mechanism with the cover of the handle being taken off.
Figure 3:
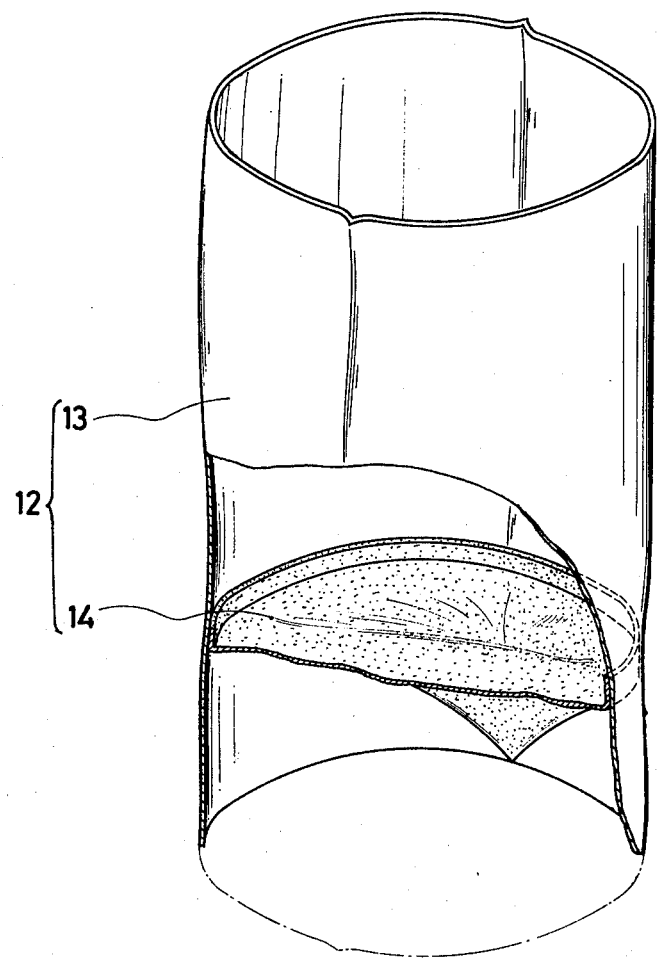
FIG. 3 provides an oblique view of the extraction bag, showing part thereof in section.

The coffee extracting apparatus of this invention is composed of an extractor 1, extraction bag 12 to be inserted, closely fit and detachable, in the said extractor and the take-up mechanism 15 detachably mounted on the top of the extractor 1, by which the extraction bag 12 may be pulled up while its upper opening being squeezed.

In the aforementioned extractor 1, the cover 5 is detachably put on the upper opening of the vessel body 2 made of a heat resistant and reinforced glass, etc. The vessel body 2 has the pouring mouth 3 projected at its upper rim and the handle 4 provided on its side surface. The cover body 5 has a cover plate 6 fitted on the upper opening of the vessel body 2, in which an opening 7 is provided at the center, with the bearing cylinder 8 projected, surrounding the said opening 7, and on the top of the cylinder 8, a cap 9 is detachably fitted. Within the aforementioned bearing cylinder 8, a narrowing metal frame 10 is provided, to restrict the lateral breadth of the extraction bag 12, while bearing grooves 11, 11, are provided on the upper rim of the cylinder 8, facing each other, on which the reel 18 of the take-up mechanism 15 is detachably and rotatably mounted.

The extraction bag 12 is made of a soft film of such a synthetic resin film as vinyl, for example, which is formed by fitting the bag bottom 14 made of filter paper, filter cloth or another filtering material to the bottom of the film tube opened at top and bottom which is inflatable to the degree slightly larger than the volume of the aforementioned vessel body, and negligibly deeper than the depth of the vessel, and then, by integrally joining the circumference of the bag bottom 14 and the lower rim of the tube 13 by use of a welder or other bonding means.

In the take-up mechanism 15 of the extraction bag 12, one end of the reel 18 is rotatably held in place within the case-shape hollow handle 17, with such a rotation biasing means 16 as a rubber band, wound spring, etc., interposed between the handle 17 and the reel 18, and on one end of the handle 17, a flange plate 22 with beveled notches 23 formed at definite intervals over its circumference is provided, while on the cover plate 6, is provided the back turn preventing means 21 having the ridge 24, designed to be pressed against the notch 23, which may permit the flange plate 22 to turn in one direction, but prevents the back turn of the flange plate 22. On the reel 18, a friction rubber cylinder 20 is fitted. On the outside circumference of this rubber cylinder, the upper end of the extraction bag 12 is wound on, and the handle is turned in defiance to the spring force of the biasing means 16, twisting it several times in one direction. Then, as its back turn is prevented by means of the back turn preventing means 21, the reel 18, driven by the biasing means 16, rotates, while gradually winding the upper end of the bag.

Operation of the Device

The extraction bag 12 is inserted in the vessel body 2, with the upper rim of the bag 12 being folded back along the upper opening or pouring mouth 3 of the vessel body 2, thereby widening the opening of the bag. Then, as a specified amount of the ground coffee beans and a definite quantity of hot water 26 are put in the extraction bag 12, the lower part of the bag 12 is fully filled inside the vessel 2. The upper opening of the bag 12 is squeezed when it passes through the narrowing metal frame 10, and the upper end is wound about the reel 18 of the take-up mechanism 15, and securely held thereto. As the turned position of the handle 17 is held by engaging the flange plate 22 to the ridge 24 after providing the torque in terms of bias to the reel 18 by way of turning the handle 17, the reel 18, by the force of restitution of the biasing means, pulls up the bag 12 by taking it up, while gradually squeezing the extraction bag 12. In response to the up-rising of the extraction bag 12, an aspirating action develops in the vessel body 2 downward of the bag bottom 14. The hot water 26 in the bag 12 in which the coffee extract is dissolved, may pass through the filtering bag bottom 14, and the coffee extract 27 in possession of its intrinsic coffee flavor comes out to be held in the vessel body.

The take-up of the extraction bag 12 may be accomplished in a definite period of time, as determined by the spring force of the biasing means 16. Since the bag taken up is located below the pouring mouth 3, as shown by the dotted broken line in the drawing, the coffee extract 27 may be put out by tilting the extractor 1, with or without taking off the cover body 5.

In disposing of the coffee extraction residuum, the cover body 5 containing the extraction bag 12 is taken off the body 2; the cap 9 is removed from the bearing cylinder 8 of the cover body 5; and the ridge 24 is disengaged from the notch 23 of the handle 17 by letting the handle 17 side of the reel 18 float up from the bearing groove 11; then, the extraction bag 12 is pulled downward of the cover body 5, and the upper part of the bag 12 comes loose off the reel 18. Thereafter, the bag 12 is tied with a rubber ring, etc., at its upper part, and is thrown away as it is.

According to the present invention, the intrinsic coffee flavor is preserved, because the hot water having the coffee extract dissolved therein is held in the vessel, with the protection thus afforded against its oxidation by the ambient air, and then, the coffee residuum may be thrown away, contained, as it is in the bag taken up, thereby facilitating its hygienic disposal.

We claim:

1. An apparatus for extracting coffee rich in flavor while preventing, as much as possible, the oxidation of the coffee due to the air of the hot water dissolved out the coffee extract, comprising:
    a. a vessel opened at its top, with a pouring mouth and handle provided thereon and
    b. a cover which is adapted to fit the opening of the vessel, and a bearing cylinder means opened at its top and bottom and projecting upwardly from said cover, and
    c. a take-up mechanism on the vessel supported for operation on the bearing cylinder, and operative to pull toward the opened top of the vessel, an extraction bag having a filtering bottom being inserted in the vessel through the take-up mechanism, while being squeezed at its mouth by the said mechanism.

2. A coffee extracting mechanism defined in claim 1, in which the take up mechanism is composed of a reel with a shaft rotatably mounted on the opening of the bearing cylinder means and a handle fitted to one end of the reel.

3. A coffee extracting apparatus defined in claim 2, in which the handle and the reel are coupled through the intermediary of a biasing means in the form of a resilient member, so that the reel may be biased for rotation to one direction only by way of the operation of the handle.

4. A coffee extracting apparatus defined in claim 3, in which the shaft of the reel of the take-up mechanism is mounted on the bearing cylinder means, and the bearing cylinder means opened at its top and bottom projected from the cover.

5. A coffee extracting apparatus defined in claim 4, in which a means for preventing the reverse rotation of the handle by holding said handle in a position to which it has been turned, is provided between the handle and the cover.

6. A coffee extracting apparatus defined in claim 5, in which the means for preventing the reverse rotation of the handle is composed of a flange plate with notches formed on the circular circumference thereof at equidistance intervals and which is securely affixed to the handle, with a ridge element pressed against the circular circumference of the flange plate, adapted to be engaged with the respective notch.

7. A coffee extracting apparatus defined in claim 6, in which a cap for closing the upper opening of the bearing cylinder and a compression means with which the mouth of the extraction bag inserted into the bearing cylinder may be compressed.

* * * * *